No. 764,842. PATENTED JULY 12, 1904.
W. H. FAUBER.
FOLDING BED.
APPLICATION FILED MAR. 24, 1902.
NO MODEL. 7 SHEETS—SHEET 1.
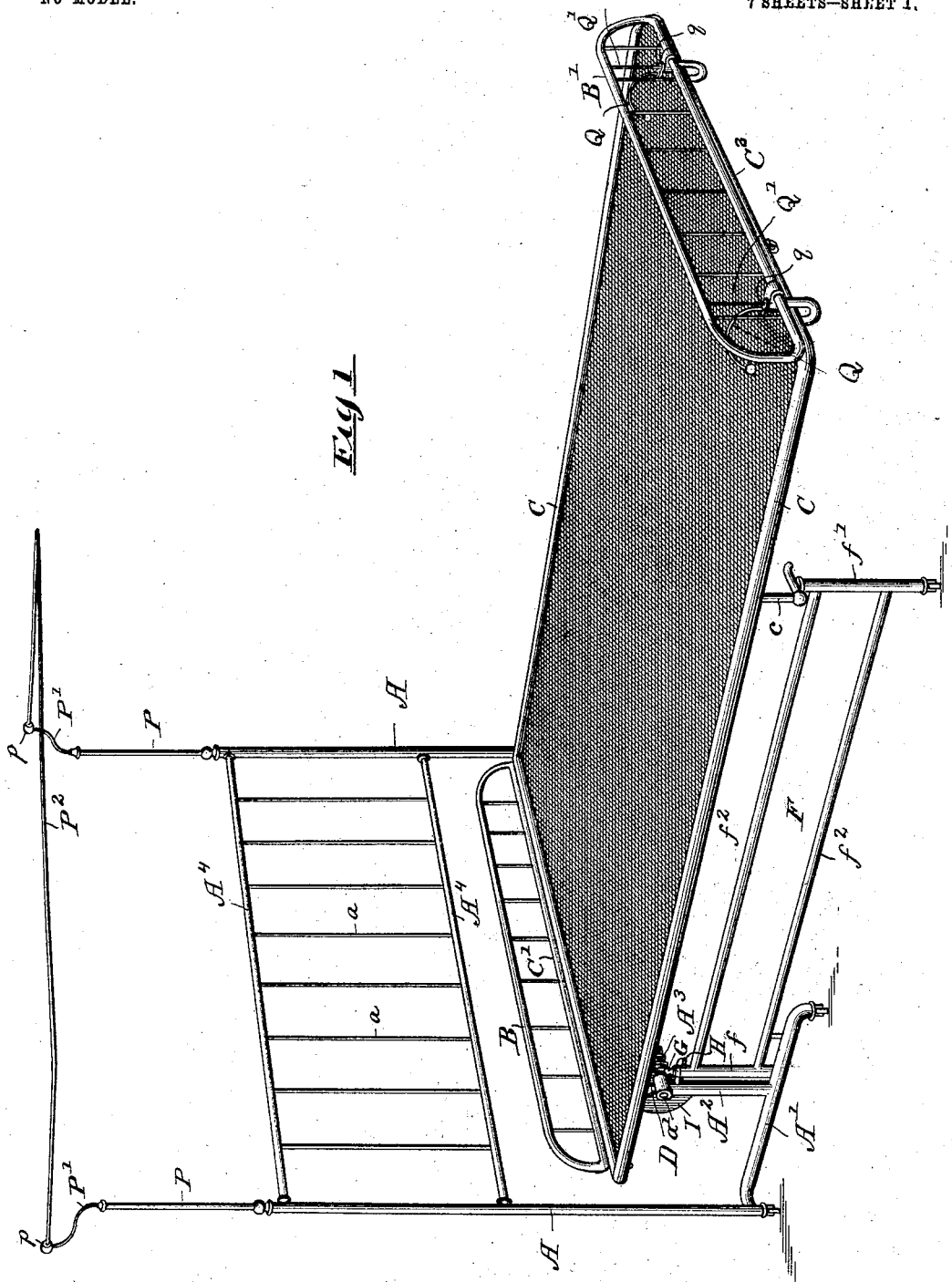
Witnesses:
Carl H. Crawford
William H. Hall
Inventor:
William H. Fauber
by Poole & Brown
his Attorneys

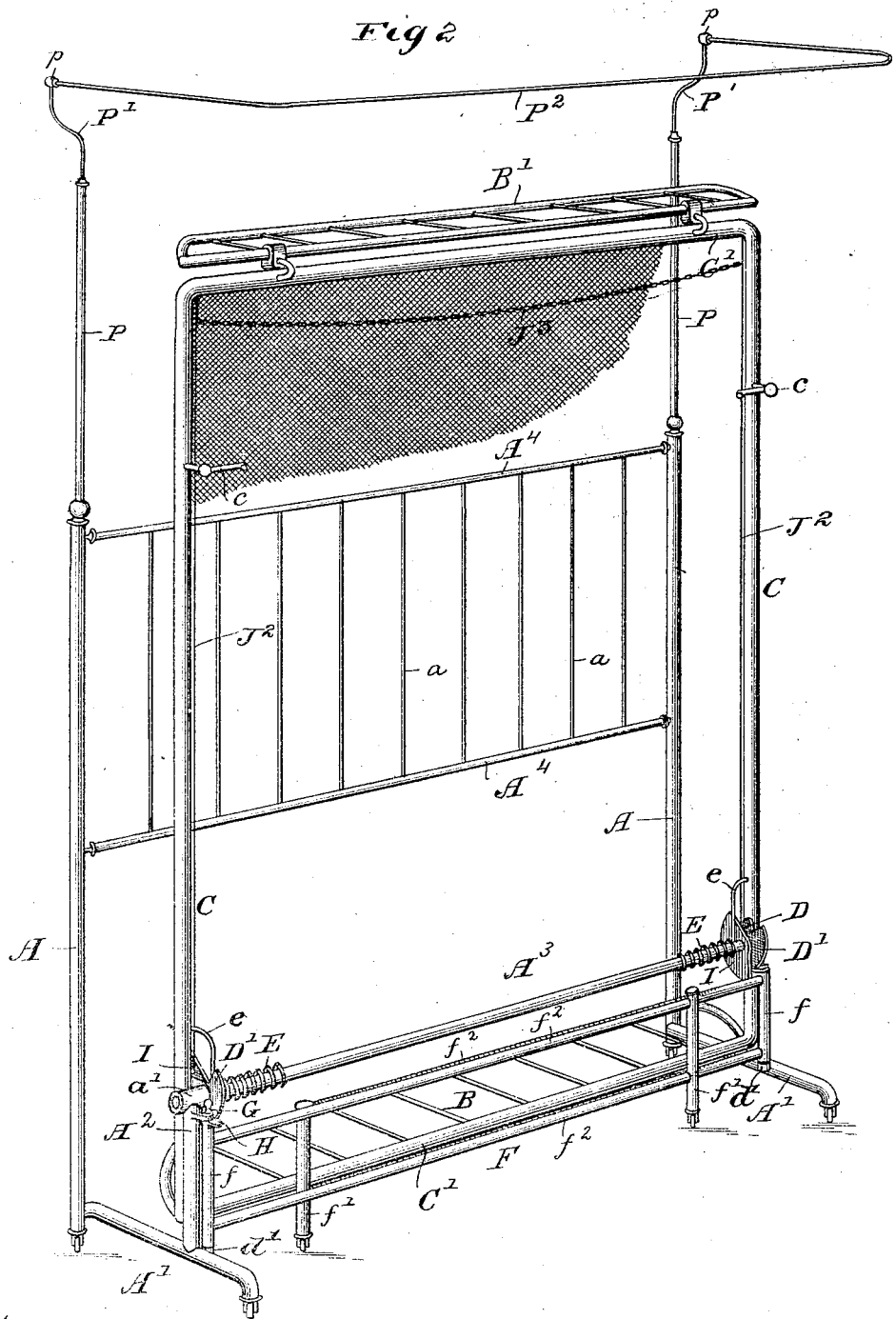

No. 764,842. PATENTED JULY 12, 1904.
W. H. FAUBER.
FOLDING BED.
APPLICATION FILED MAR. 24, 1902.
NO MODEL. 7 SHEETS—SHEET 3.
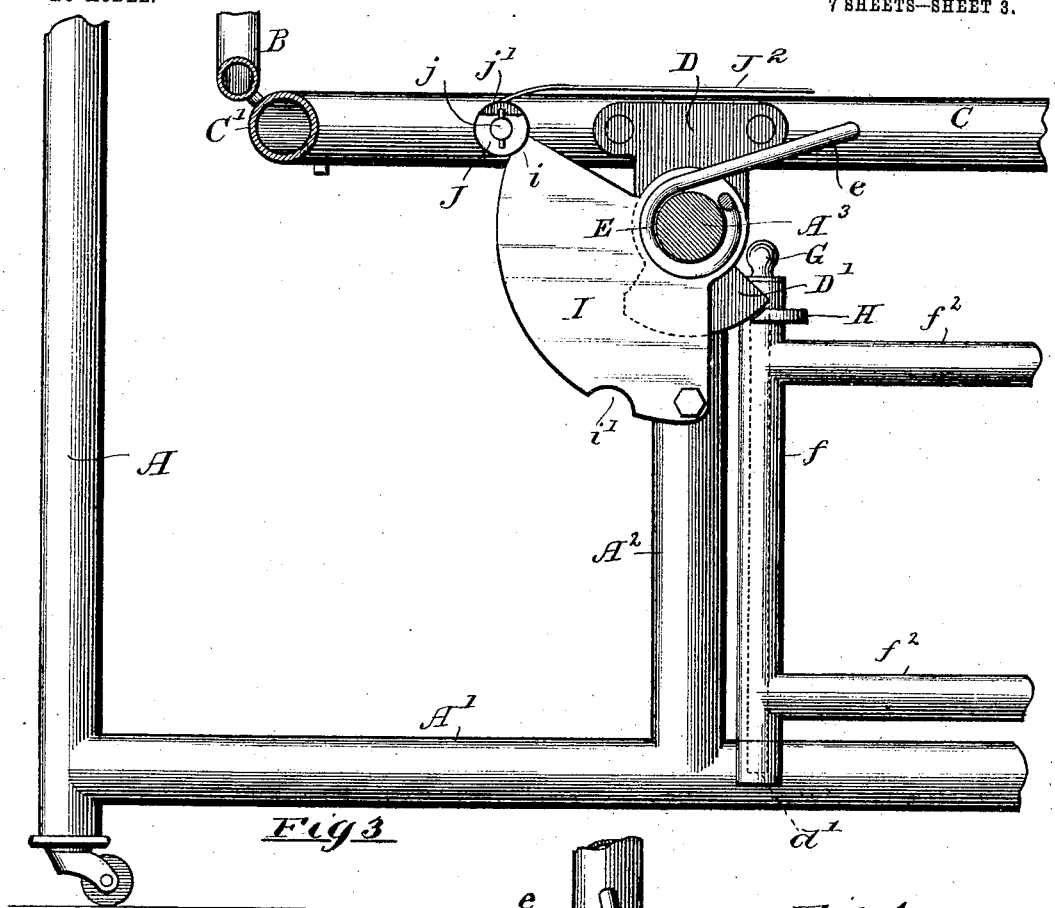
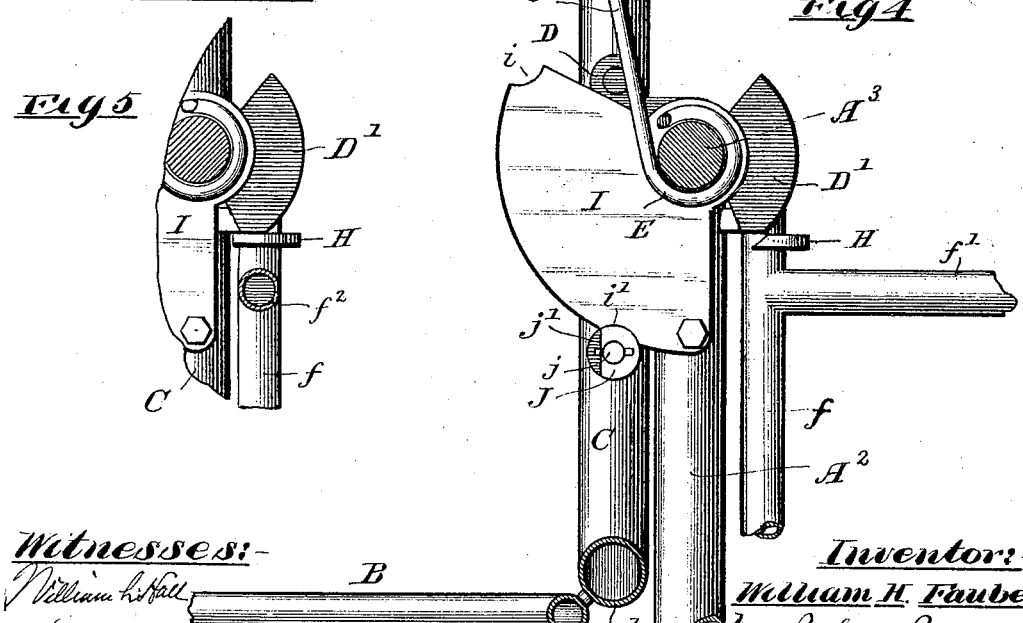
Witnesses:
William Littell
Edwin C. Ewing
Inventor:
William H. Fauber
by Poole & Brown
his Attorneys

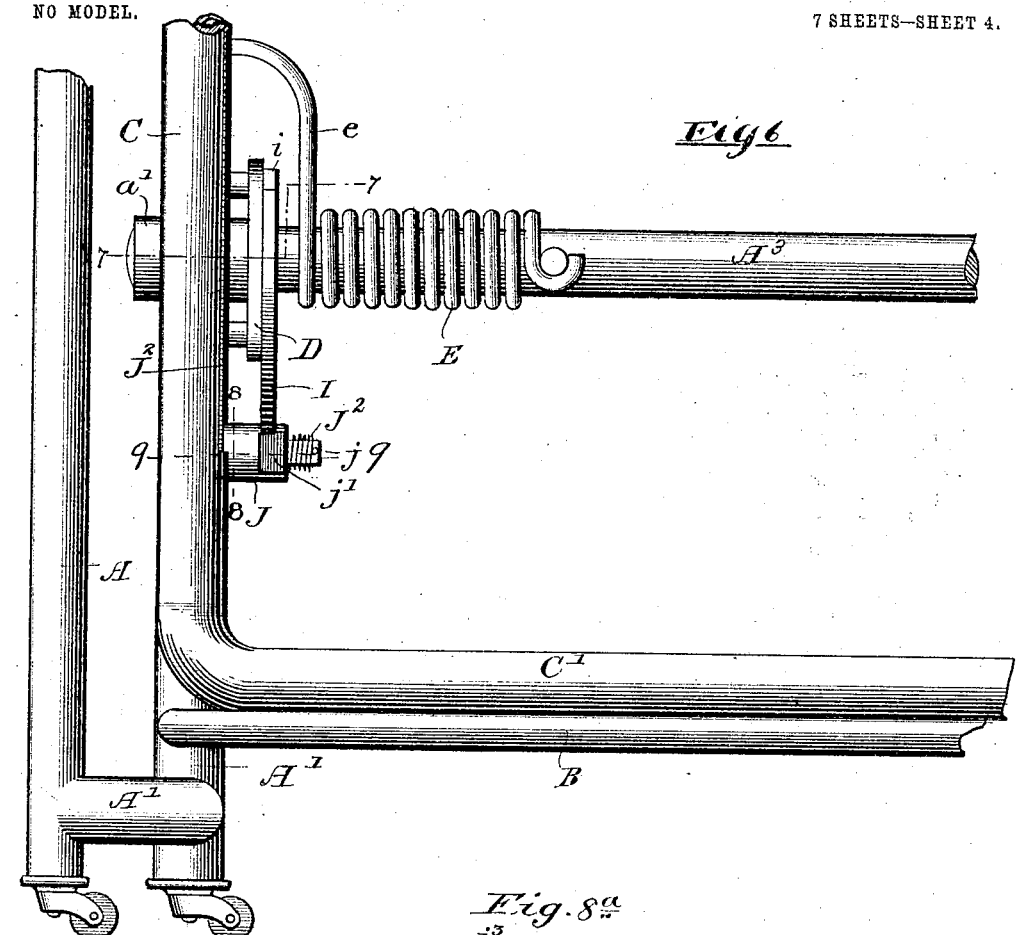

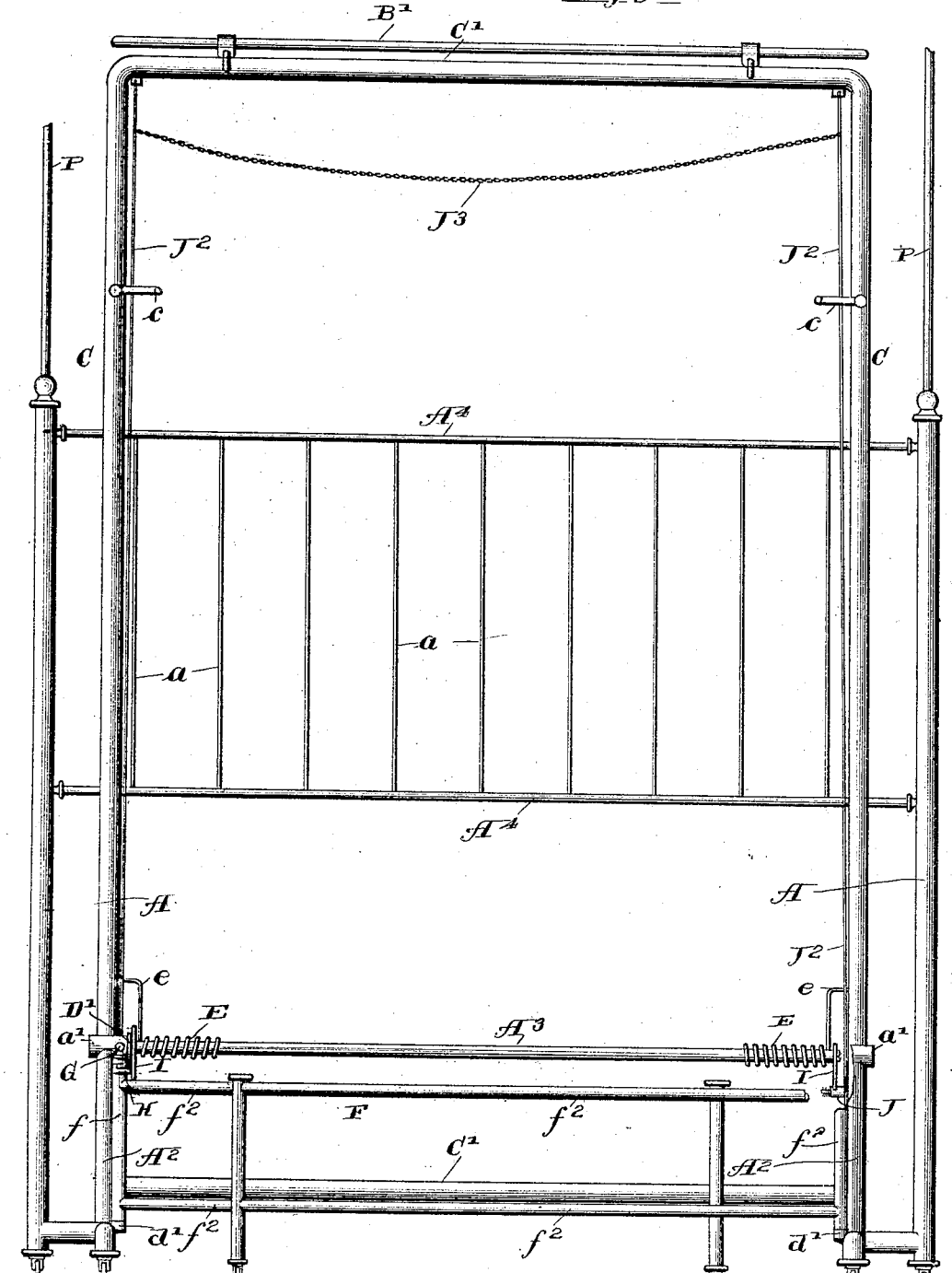

No. 764,842. PATENTED JULY 12, 1904.
W. H. FAUBER.
FOLDING BED.
APPLICATION FILED MAR. 24, 1902.
NO MODEL. 7 SHEETS—SHEET 6.
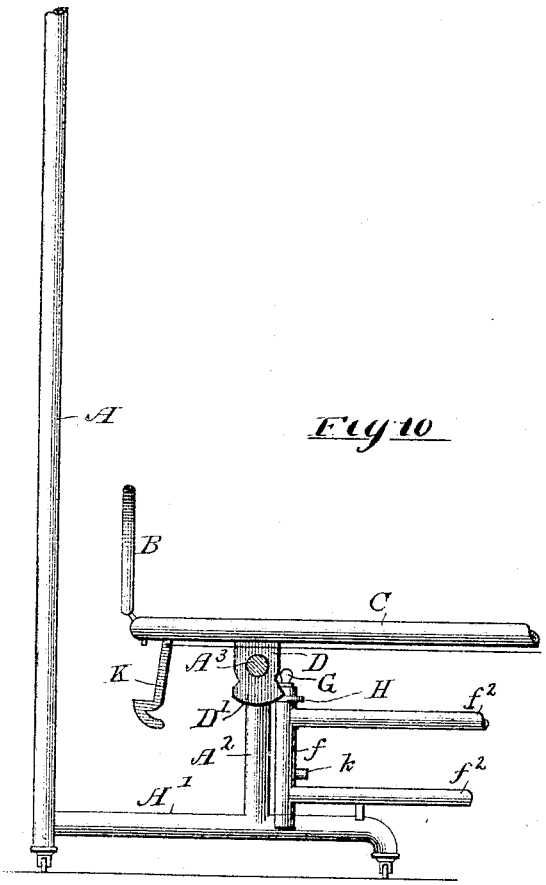
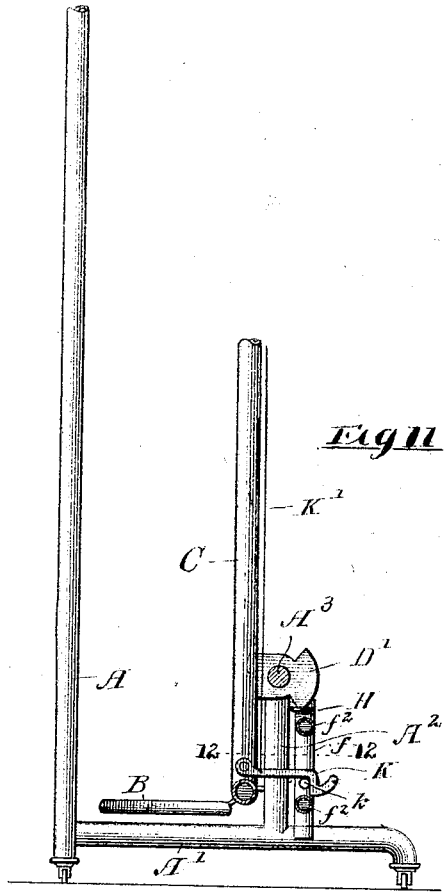
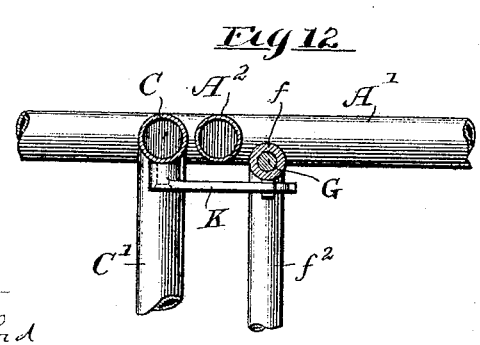
Witnesses:
Carl S. Crawford
William L. Hall
Inventor:
William H. Fauber
by Poole & Brown
his Attorneys No. 764,842. PATENTED JULY 12, 1904.
W. H. FAUBER.
FOLDING BED.
APPLICATION FILED MAR. 24, 1902.
NO MODEL. 7 SHEETS—SHEET 7.
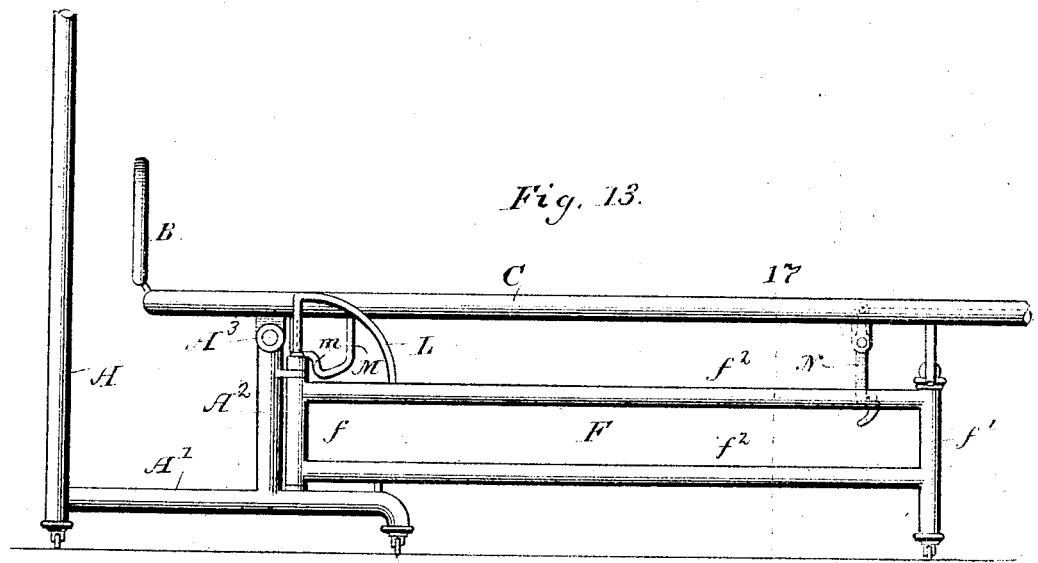
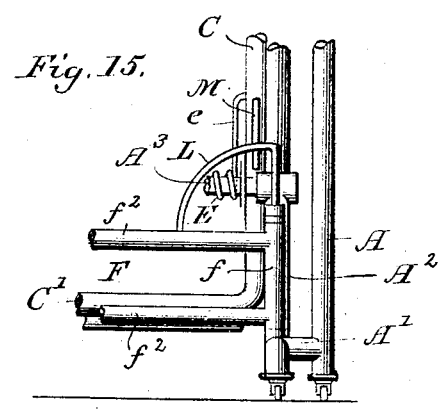
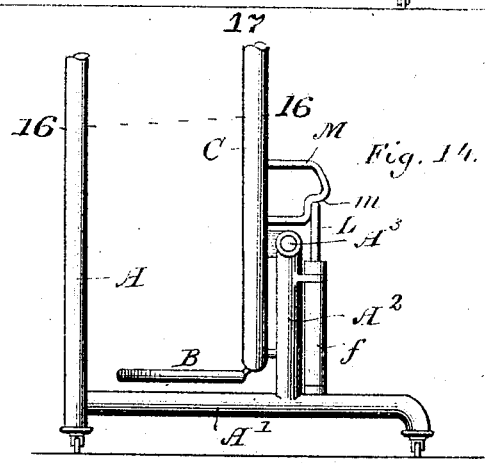
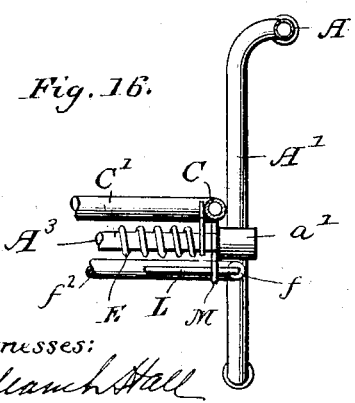
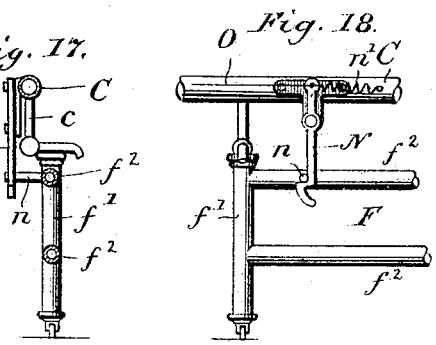

No. 764,842. Patented July 12, 1904.

UNITED STATES PATENT OFFICE.

WILLIAM H. FAUBER, OF ELGIN, ILLINOIS.

FOLDING BED.

SPECIFICATION forming part of Letters Patent No. 764,842, dated July 12, 1904.

Application filed March 24, 1902. Serial No. 99,575. (No model.)

*To all whom it may concern:*

Be it known that I, WILLIAM H. FAUBER, of Elgin, in the county of Kane and State of Illinois, have invented certain new and useful Improvements in Folding Beds; and I do hereby declare that the following is a full, clear, and exact description thereof, reference being had to the accompanying drawings, and to the letters of reference marked thereon, which form a part of this specification.

This invention relates to improvements in the construction of folding beds of that class in which the bed-frame which supports the mattress has pivotal connection near the upper end or head thereof to a stationary supporting or base frame and in which the foot or lower end of the bed-frame is swung about a horizontal axis to bring the same into a vertical or folded position.
A folding bed embodying my invention embraces, in connection with a stationary main, base, or head frame and a bed-frame pivoted thereto, wings or leaves hinged to the stationary frame in such manner as to swing in a horizontal plane and which are adapted to be folded back against the main frame or to be swung outwardly at right angles thereto and when in their extended position to rest in contact with the floor at points forward of said main frame, so as to prevent the main frame from tipping forward under the weight of the bed-frame as the same is being lowered, and which form supports for said bed-frame when in its lowered or horizonal position.
My invention also includes means for locking the bed-frame both in its folded or upright and in its lowered positions and means operated automatically by the said wings operating to positively lock the bed-frame in its upright position when the wings are folded in against the main frame and for positively locking the wings from being swung inwardly when the bed-frame is in its horizontal position.
The invention consists in the matters hereinafter described, and pointed out in the appended claims.

As shown in the accompanying drawings, Figure 1 is a perspective view of a metal folding bed embodying my invention, showing the bed-frame in its lowered or horizontal position. Fig. 2 is a perspective view of the bed with the bed-frame in its folded position. Fig. 3 is a detail sectional elevation showing the parts adjacent to the pivot of the folding-bed frame when the same is in its horizontal position. Fig. 4 is a similar view showing the bed-frame in its vertical position and the wing extended. Fig. 5 is a detail view of the parts shown in Figs. 3 and 4, illustrating the bed-frame in its vertical position when the wings are folded in against the bed-frame. Fig. 6 is a front elevation of the parts shown in Figs. 3 and 4, illustrating the bed-frame in its folded position. Fig. 7 is a plan section taken on line 7 7 of Fig. 6. Fig. 8 is a detail section taken on line 8 8 of Fig. 6, showing the locking segment and detent for the bed-frame. Fig. $8^a$ is a detail perspective view of the detent shown in Fig. 8. Fig. 9 is a detail section taken on line 9 9 of Fig. 6. Fig. $9^a$ is a face view of the bed-frame and base-frame, showing the bed-frame folded upwardly and illustrating more particularly the devices on the bed-frame for operating the locking-detents. Figs. 10 and 11 are detail sections showing a modified form of the locking devices, Fig. 10 showing the bed-frame in its horizontal and Fig. 11 the bed-frame in its upright position. Fig. 12 is a plan section taken on line 12 12 of Fig. 11. Fig. 13 is a view in side elevation of a bed like that shown in the other figures, illustrating still another form of locking devices, this figure showing the bed in its horizontal position. Fig. 14 shows the same parts with the bed in its upright position. Fig. 15 is a detail front elevation of the parts shown in Fig. 14. Fig. 16 is a plan section taken on line 16 16 of Fig. 14. Fig. 17 is a detail section taken on line 17 17 of Fig. 13. Fig. 18 is a view from the inside of the bed-frame of the parts shown in Fig. 17.

The bed shown in the said drawings is made as follows:

The stationary part, main, base, or head frame of the bed consists of two upright posts A A, parallel horizontal frame members A' A', which extend forward from the posts A A, standards $A^2 A^2$, which rise from the horizontal members A' A' at a short distance forward from the side posts A A, and a transverse connecting-rod A³, which is rigidly attached to the upper ends of the standards A², which serves to connect the lower parts of the side members of the head-frame with each other, and which also constitutes a pivot-rod on which the movable part or bed-frame is pivotally supported. The side posts A A are connected with each other by means of transverse bars A⁴ A⁴, which, with suitable connecting-rods a a, form a headboard for the bed.

The movable part or bed-frame consists of two side bars C C and transverse head-bar C' and a transverse foot-bar C², these parts being rigidly connected with each other to form a rectangular frame. Said frame is shown as provided with a headboard B and a footboard B'. The bed-frame is pivotally connected with the pivot-rod A³ by means of bracket-plates D D, which are attached to the side bars C C of said frame and which extend downwardly therefrom when the bed-frame is in its horizontal position, said bracket-plates being provided with bearing-apertures through which pass the ends of the pivot-rod A³. Said pivot-rod is shown as inserted at its ends in horizontal cylindric sockets a', secured to the upper ends of the frame-standards A², and as secured or held from rotation in said sockets by means of set-screws a², as clearly shown in Fig. 7.

E E indicate lifting-springs which are applied to the bed-frame to counterbalance the weight of the lower end thereof and aid in raising the same to its vertical position. Said springs are shown as made of coiled form and arranged around said pivot-rod A³, said springs being attached at their inner ends to said pivot-rod and having at their outer ends outwardly-extending rods e, which are engaged with the side bars C of said frame at points at a considerable distance from said pivot-rod A³.

F F indicate as a whole wings or gates which are pivotally connected with the head-frame so as to swing in vertical axes and are adapted to be folded inwardly against the head-frame and to be swung outwardly into position at right angles to the said frame. Said wings are herein shown as pivoted to the head-frame at a point adjacent to and forward of the frame-standards A². Said wings are, moreover, shown as consisting of inner uprights f, outer uprights or posts f', and horizontal connecting-bars f². The outer uprights or posts f' are adapted to rest upon the floor and are herein shown as provided with casters or rollers. When in their outer or extended position, the wings F F are arranged to support the outer or foot end of the bed-frame, and for this purpose the posts f' thereof are arranged to engage at their upper ends with the bed-frame or a part thereof. In the particular construction shown the bed-frame is provided with L-shaped arms c, which project outwardly or downwardly therefrom and are provided with horizontal parts adapted to rest upon the upper ends of the posts f' and which serve as handles by which the bed-frame may be raised or lowered. The wings F F may be pivoted to the head-frame in any suitable manner; but as herein shown the said wings are connected with the head-frame by means of a pivot-rod G, passed through the inner uprights f of the wings, which are made tubular to receive them and are engaged at their lower ends with lugs d', which extend inwardly from the horizontal frame members A' and at their upper ends are engaged with lugs g, which extend forwardly from the frame-standards A².

Means for automatically locking the bed-frame in its upright position and for locking the wings F in their extended position are provided as follows: The bearing-brackets D on the bed-frame are provided with rigid extensions or segmental locking-plates D', the outer edges of which are curved concentrically with the pivot-rod A³. The said segments D' are located in planes just inside of the inner uprights f of the wings F, and on said uprights f near their upper ends are rigidly attached horizontal segmental locking-plates H. The locking-plates D' extend below the level of the plates H, and the latter are so arranged that when the bed-frame is horizontal and the wings are swung outwardly or are in their extended positions the inner or rear ends of the said plates H will bear edgewise against the forward or outer curved edges of the plates D', as clearly seen in Fig. 3. The plate D' and H are also so arranged that when the bed-frame is upright the lower ends of the plates D' will stand just above the level of the top surfaces of the plates H, as seen in Fig. 4, so that the plates H will be free to swing under the plates D' when the wings are swung inwardly on their pivots, and when the wings are folded the said plates H will stand beneath the said lower ends of the plates D', and thus lock or hold the bed-frame from being lowered, as clearly seen in Fig. 5. From the above it will be seen that when the bed-frame is in its upright or folded position and the wings are also folded the bed-frame is locked in its upright position and cannot be lowered until the wings have been swung outwardly into their extended positions. It will be also seen that when the bed-frame is horizontal and the wings are extended the latter cannot be swung inwardly until the bed-frame has been raised to its vertical position. The locking device described therefore affords an automatic safety appliance by which the bed-frame cannot be lowered until the wings have been swung outwardly and are in position both to hold the head-frame from tipping forward during the lowering of the bed-frame and to support the foot end of the bed-frame when the same reaches its horizontal position. Such automatic locking device also makes it impossible for the wings to be swung inwardly or away from their supporting position so long as the bed-frame is horizontal, and thereby avoids liability of the foot end of the bed-frame being depressed and the head-frame thereby tipped forward at any time when the bed is in condition for use.

In addition to the automatic locking devices described I have also provided a manually-operable safety locking device for locking the bed-frame in its upright and horizontal position, as follows: I is a segmental locking-plate which is rigidly attached to one of the frame-standards $A^2$, preferably at a point adjacent to and inside of the locking-plates D' on the bed-frame. The locking-plate I is provided with a curved outer edge, which is concentric with the pivot-rod $A^3$, and also with two locking-notches $i$ $i'$. On the bed-frame is a locking-detent J, which extends inwardly from the side bar C of the bed-frame in position to engage the locking-notches $i$ $i'$. Said detent has the form of a rotative cylinder mounted on a pivot-stud $j$, which is rigidly affixed in the bed-frame side bar. Said cylinder is cut away at one of its sides to form a flat surface $j'$, Fig. 4, and the cylinder is so arranged with respect to the plate I that when said cylinder is turned to bring the flat surface $j'$ toward the plate the latter may swing freely with its edge in contact with said flat surface, and when one of the notches $i$ $i'$ is opposite the cylinder the same may be turned to carry the flat surface $j'$ away from the edge of the plate and the convex part of the cylinder into engagement with one of said notches, thereby locking the plate and the bed-frame from movement. The detent-cylinder J is yieldingly held in its locking position by means of a spring J', shown in the drawings as made of coiled form and applied around the pivot-stud $j$, with one of its ends attached to the stud and the other engaged with the cylinder, a suitable stop being applied to limit the rotation of the cylinder under the action of the spring, said stop, as shown in the drawings, consisting of a stud $j^2$ on the bar C, arranged to engage radial shoulders $j^3$ $j^4$ on the inner end of the cylinder.

The locking devices described are duplicated on the opposite sides of the bed-frame, and for actuating the detent-cylinders J wires $J^2$ are attached to the same and extend outwardly to the outer cross-bar of the bed-frame. A cross-chain $J^3$ is attached at its ends to the wires $J^2$ and extends across the bed-frame. When said chain is grasped by the hand and drawn outwardly or downwardly, it flexes the wires $J^2$, with the effect of rotating the detent-cylinders J against the action of their actuating-springs, so as to bring the flat faces of the cylinders inwardly or toward the locking-plate and to release the cylinders from the notches in said plate. The bed-frame will thus be released, so that it may be raised or lowered. The chain $J^3$ will preferably be located at the upper or outer part of the bed-frame, so that it will be out of the reach of children. The detents J and their actuating devices form a safety locking device additional to that afforded by the interlocking of the locking-plates D' and H, it being necessary not only to swing the wings F outwardly, but also to pull the chain $J^3$ before the bed-frame can be lowered, so that there will be no danger of the bed-frame being pulled down except by a person who intentionally operates the parts in the proper manner for doing so.

In Figs. 10, 11, and 12 I have shown a construction in which in place of the safety locking device described a hooked detent K is pivoted to each side bar C of the bed-frame in position to engage a rigid pin or stud $k$ on the adjacent wing F. A wire K' is shown as attached to the detent K, one of said wires being arranged at each side of the bed-frame, and both wires being operated by a cross-chain like the chain $J^3$ before described. The detent K not only serves to hold the bed-frame in its vertical position, but also to hold the wing F in its closed position, so that until the detent K is released from the said wing the latter cannot be swung out and the bed-frame cannot be lowered, the bed-frame being held from descending by the locking-plates D' and H on the bed-frame and wing F, which in this instance are arranged in the same manner as shown in the preceding figures of the drawings.

In Figs. 13 to 18 I have shown locking devices differing from these before described, both for holding the bed-frame in its upright and horizontal positions and for locking the wings in their extended positions. In this instance each wing F is provided near its pivoted end with an upwardly-extending loop L, which is located outside of the side bar of the bed-frame when the latter is lowered and the wing is in its extended position. The bed-frame is also provided with a loop M, which projects outwardly from the bed-frame side bar far enough to engage the loop L when the bed-frame is upright. Said bail M is provided with a downwardly-facing shoulder $m$ so arranged that when the bed-frame is upright and the wing F is folded in the shoulder will rest over or upon the said loop L, and thereby hold the bed-frame from descending, as clearly shown in Figs. 14 and 15. When the wing is swung outwardly, the loop L stands outside of the bail M, so that as soon as the bed-frame is swung outward a short distance the said loop L will engage the bail and hold the wing from being swung inward. When the bed-frame is horizontal, the loop L will engage both the bail M and the side bar C, and the wing will thereby be held positively in its extended position and cannot be swung in until the bed-frame is fully raised. In said Figs. 13 to 18 I have also shown another means for locking the bed-frame in its lowered position in which the bed-frame is engaged directly with the wings F. In this instance the side bars C of the bed-frame are provided with pivoted hooked detents N, which project from the said side bars in such position that they project downwardly toward the wings F when the bed-frame is in its horizontal position. The hooked ends of said detents are adapted to engage horizontal studs $n$, located on the upper bars of the said wings in position for engagement with said detents. Springs $n'$ are applied to act on the detents, so as to throw them into position for engagement with the studs $n$. Wires O are attached to the detents and extend toward the foot end of the bed-frame. Said wires may be arranged as are the wires $J^2$, before described, in which case they will be connected by a chain like the chain $J^3$. The wires O operate to move the detents N against the action of the springs $n'$, so as to release them from the studs $n$. The said detents N so arranged, as described, are adapted to automatically engage the studs $n$ when the bed-frame is lowered, and thereby lock said bed-frame from rising. When it is desired to close the bed, the detents are released and the bed lifted. The said detents in this case serve as a safety locking device intended to avoid possibility of the bed closing or being closed except when the detents are intentionally released.

Provision is made for supporting a curtain to cover the bed-frame when the same is in its folded or upright position, as follows: P P, Figs. 1 and 2, are upright rods which fit at their lower ends in sockets in the upper ends of the posts A A and form upward continuations of said posts. Attached to the upper ends of said rods are brackets P' P', which are deflected laterally outward and terminate in balls $p\ p$. Said balls $p\ p$ have horizontal sockets in which are inserted the ends of a horizontal curtain-rod $P^2$, which is bent to form the parallel end portions, and a transverse portion, which extends over the bed-frame and is located forward of the same a sufficient distance to permit curtains suspended therefrom to hang freely in front of the folded bed-frame. The parallel side portions of said curtain-rod are adapted to receive the curtains when the same are pushed back away from the front of the bed-frame when the same is lowered for use.

The features shown in Figs. 10 to 18, which are embraced under the appended broad claims, are intended to form the subject-matter of separate applications to be hereinafter filed.

For holding the mattress in place when the bed-frame is upright clamps are provided, consisting of clamp-arms Q, attached to blocks $q$, which slide on rods Q', attached to the foot-board B'. The blocks $q$ are short, so that they will bind on the rods and hold the arms from sliding outward under outward pressure on the ends of the clamp-arms. The clamp-arms may be released and moved outward by pressing inwardly on their free ends to release the blocks and then drawing the blocks outward.

I claim as my invention—

1. A folding bed comprising a base-frame, a bed-frame pivoted thereto, and wings pivoted to the base-frame so as to swing horizontally, said wings being constructed to engage the bed-frame at points distant from its pivotal axis and to thereby support the moving end of the bed-frame when the latter is in its lowered position.

2. A folding bed comprising a base-frame, a bed-frame pivoted thereto, wings pivoted to the base-frame and adapted to be swung outwardly at right angles thereto and to be folded inwardly against the same and locking means for holding the bed-frame in its raised position, said locking means being connected with and operated by the movements of the wings and being constructed to remain in its locking position when the wings are in other than their extended positions and to be moved into its unlocked position when the wings are thrown into their extended position.

3. A folding bed comprising a base-frame, a bed-frame pivoted thereto, wings pivoted to the base-frame and adapted to be swung outwardly at right angles thereto and to be folded inwardly against the same and locking means for holding the wings extended, said locking means being connected with, and operated by the movement of the bed-frame, and being constructed to remain in position to hold the wings extended when the bed-frame is in other than its raised position.

4. A folding bed comprising a base-frame, a bed-frame pivoted thereto, wings pivoted to the base-frame and adapted to be swung outwardly at right angles to the bed-frame and to be folded inwardly against the same for holding the bed-frame in its raised position and the wings in their extended position, said locking means being connected with and operated by the movements of the bed-frame and the said wings and said locking means being constructed to remain in position to lock the bed-frame elevated when the wings are in other than their extended position and in position to lock the wings extended when the bed-frame is in other than its raised position.

5. A folding bed comprising a base-frame, a bed-frame pivoted thereto, wings pivoted to the base-frame and adapted to be swung outwardly at right angles to the base-frame and to be folded inwardly against the same, locking means for holding the bed-frame in its raised position and the wings in their extended positions, said locking means being connected with, and operated by the movements of the bed-frame and wings, and being constructed to lock the wings in their extended positions when the bed-frame is lowered and to lock the bed-frame in its elevated position when the wings are folded inwardly and manually-operable safety locking means for locking the bed-frame in its elevated position.

6. A folding bed comprising a base-frame, a bed-frame pivoted thereto, wings pivoted to the base-frame and adapted to be swung outwardly at right angles to the base-frame and to be folded inwardly against the same, locking means for holding the bed-frame in its raised position and the wings in their extended positions, said locking means being connected with and operated by the movements of the bed-frame and wings and being constructed to lock the wings in their extended position when the bed-frame is lowered and to lock the bed-frame in its elevated position when the wings are folded inwardly, and manually-operable safety locking means for locking the bed-frame in its lowered position.

7. The combination with a base-frame, of a bed-frame pivoted thereto, wings pivotally connected with the bed-frame so as to swing in vertical axes, rotative locking-plates attached to and turning with the bed-frame, and rotative locking-plates attached to and turning with the wings, the locking-plates on the bed-frame and wings being constructed to interlock with each other so as to hold the bed-frame in its raised position when the wings are folded and to hold the wings extended when the bed-frame is lowered.

8. A folding bed comprising a base-frame, a bed-frame pivoted thereto, wings pivoted to the base-frame and adapted to be swung outwardly at right angles to the base-frame, and to be folded inwardly against the same, locking means for holding the bed-frame in its raised position and the wings in their extended positions, said locking means being connected with and operated by the movements of the bed-frame and wings and being constructed to lock the wings in their extended position when the bed-frame is lowered and to lock the bed-frame in its elevated position when the wings are folded inwardly, and manually-operable safety locking means for holding the bed-frame in its horizontal and raised positions comprising a segmental locking-plate attached to the base-frame and a spring-actuated detent mounted on the bed-frame and adapted to engage said locking-plate.

In testimony that I claim the foregoing as my invention I affix my signature, in presence of two witnesses, this 17th day of March, A. D. 1902.

WILLIAM H. FAUBER.

Witnesses:
C. CLARENCE POOLE,
WILLIAM L. HALL.